(12) United States Patent
Ryan

(10) Patent No.: US 11,718,335 B1
(45) Date of Patent: Aug. 8, 2023

(54) MOBILE SHELTERED WORKSTATION

(71) Applicant: Saul Anthony Ryan, Spring Hill, TN (US)

(72) Inventor: Saul Anthony Ryan, Spring Hill, TN (US)

( * ) Notice: Subject to any disclaimer, the term of this patent is extended or adjusted under 35 U.S.C. 154(b) by 0 days.

(21) Appl. No.: 17/948,663

(22) Filed: Sep. 20, 2022

(51) Int. Cl.
*B62B 5/00* (2006.01)
*B62B 3/02* (2006.01)

(52) U.S. Cl.
CPC .............. *B62B 5/0013* (2013.01); *B62B 3/02* (2013.01)

(58) Field of Classification Search
CPC . B62B 3/02; B62B 5/0013; A45B 2023/0087; A45B 2023/0006; A45B 2023/0093; E04H 15/28; E04H 15/46
USPC ................................. 135/88.01, 88.02, 88.1
See application file for complete search history.

(56) References Cited

U.S. PATENT DOCUMENTS

| | | | | |
|---|---|---|---|---|
| 4,000,750 | A * | 1/1977 | Becher | E04H 15/28 135/20.3 |
| 4,836,231 | A * | 6/1989 | Peterson | A45B 25/02 135/117 |
| 5,002,082 | A * | 3/1991 | Roder | E04H 15/28 135/141 |
| 5,560,383 | A * | 10/1996 | Fuller | A45B 11/00 135/88.01 |
| 5,876,047 | A * | 3/1999 | Dennis | B62B 3/007 280/47.35 |
| 7,044,145 | B2 * | 5/2006 | Bouchard | E04H 15/06 135/912 |
| 9,426,969 | B1 * | 8/2016 | Hundt | A01K 13/006 |
| 2010/0108451 | A1 * | 5/2010 | Pain | A47C 17/82 190/115 |
| 2014/0131963 | A1 * | 5/2014 | Bengtzen | A45B 23/00 280/32 |
| 2015/0059817 | A1 * | 3/2015 | Ryan | E04H 15/10 135/88.01 |

* cited by examiner

Primary Examiner — Noah Chandler Hawk
(74) Attorney, Agent, or Firm — Dale J. Ream

(57) ABSTRACT

A mobile sheltered workstation includes a housing. The workstation includes a main support member having a lower end coupled to the housing and extending upwardly therefrom, the main support member being length adjustable and telescopically movable between a retracted configuration and an extended configuration. A canopy framework includes a lower end selectively coupled to an upper end of the main support member and movable between a stowed configuration adjacent the housing and a deployed configuration displaced from the housing. A canopy is selectively coupled to the canopy framework and configured to cover a geometric area thereof.

25 Claims, 11 Drawing Sheets

MOBILE SHELTERED WORKSTATION

REFERENCE TO RELATED APPLICATIONS

This application is related to U.S. patent application Ser. No. 14/016,875, now U.S. Pat. No. 8,978,678, filed Sep. 3, 2013, and titled Mobile Sheltered Workstation by the same inventor as the present application.

BACKGROUND OF THE INVENTION

This invention relates to weather shelters and, more particularly, to a mobile sheltered workstation that provides shelter to a worker from weather elements.

Persons working outdoors often need a quick and convenient portable shelter from the weather. Gardeners, painters, utility workers, carpenters, builders, contractors, and coaches may need shelter from the blazing sun while they work. Police officers working an accident scene may need shelter from rain or snow. A mobile sheltered workstation can improve work conditions in virtually any location. In addition, workers may also need safe and convenient access to electricity while they work.

Various devices have been proposed in the art for providing a mobile sheltered workstation. Although assumably effective for their intended purposes, the current devices are too bulky, hard and time consuming to set up, and do not provide sufficient shelter. Additionally, the current devices do not provide safe and convenient access to electricity.

Therefore, it would be desirable to have a mobile sheltered workstation that includes a canopy framework that is quickly and easily movable between a stowed configuration and a deployed configuration. Further, it would be desirable to have a mobile sheltered workstation that utilizes cords, pulleys, and linkage assemblies to assist in quickly and easily moving the mobile sheltered workstation from the stowed configuration to the deployed configuration. Additionally, it would be desirable to have a mobile sheltered workstation that includes an electrical power strip within a housing.

SUMMARY OF THE INVENTION

A mobile sheltered workstation according to the present invention includes a housing. The workstation also includes a main support member having a lower end coupled to the housing and extending upwardly therefrom, the main support member being length adjustable and telescopically movable between a retracted configuration and an extended configuration. A canopy framework includes a lower end selectively coupled to an upper end of the main support member and movable between a stowed configuration adjacent the housing and a deployed configuration displaced from the housing. A canopy is selectively coupled to the canopy framework and configured to cover a geometric area thereof.

Therefore, a general object of this invention is to provide a mobile sheltered workstation that selectively shelters a work area.

Another object of this invention is to provide a mobile sheltered workstation, as aforesaid, having a main support member that is length adjustable between various intermediate positions to provide adjustable heights for deployment of a canopy cover over a work area.

Still another object of this invention is to provide a mobile sheltered workstation, as aforesaid, that utilizes cords, pulleys and linkage assemblies to assist in moving the canopy framework from a stowed configuration to a deployed configuration.

Yet another object of this invention is to provide a mobile sheltered workstation, as aforesaid, in which the housing includes an electrical power strip.

A further object of this invention is to provide a mobile sheltered workstation, as aforesaid, that is easy to setup and easy to use.

A still further object of this invention is to provide a mobile sheltered workstation, as aforesaid, that is inexpensive to manufacture.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 4b is an isolated view on an enlarged basis taken from FIG. 4a;

FIG. 8b is an isolated view on an enlarged scale taken from FIG. 8a;

FIG. 8c is an isolated view on an enlarged scale taken from FIG. 8a;

FIG. 9b is an isolated view on an enlarged scale taken from FIG. 9a;

FIG. 9c is an isolated view on an enlarged scale taken from FIG. 9a;

FIG. 9d is an isolated view on an enlarged scale taken from FIG. 9a;

FIG. 9e is an isolated view on an enlarged scale taken from FIG. 9a; and

FIG. 9f is an isolated view on an enlarged scale taken from FIG. 9a.

DESCRIPTION OF THE PREFERRED EMBODIMENT

Figure 1:
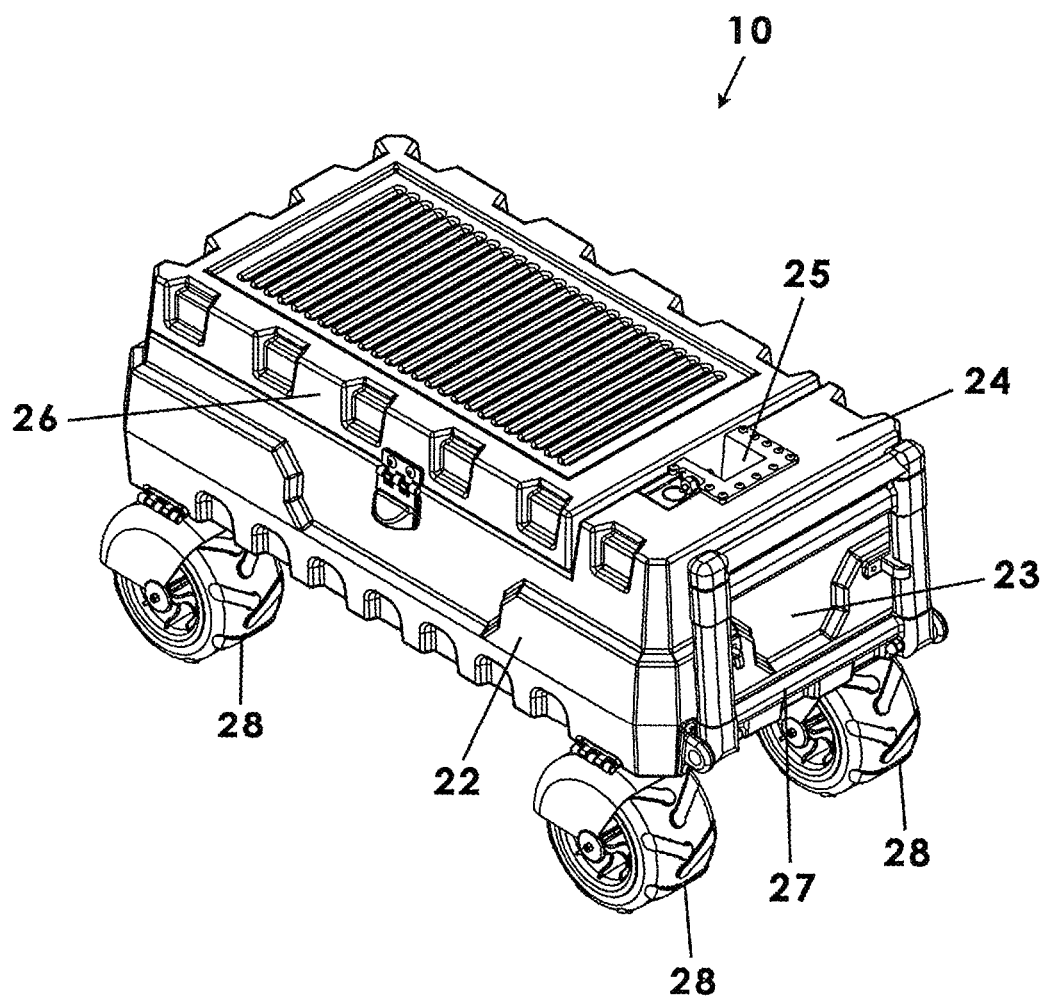
FIG. 1 is a perspective view of a mobile sheltered workstation according to a preferred embodiment of the present invention, illustrated with the canopy framework in a completely retracted and stowed configuration.

A mobile sheltered workstation according to a preferred embodiment of the present invention will now be described with reference to FIGS. 1 to 9f of the accompanying drawings. The mobile sheltered workstation 10 includes a housing 20, a main support member 100, and a canopy framework 200. The mobile sheltered workstation 10 may also include a canopy 50 selectively coupled to the canopy framework 200.

Preferably, the housing 20 is in the form of a wagon. The housing 20 may include a bottom wall 21 and a plurality of side walls 22 extending upwardly from perimeter edges of the bottom wall 21, respectively. One of the upstanding side walls may be designated as a front wall 23 for clarity of description later. Accordingly, the housing 20 may present a generally square or rectangular configuration although other configurations may also be suitable.

Figure 2:
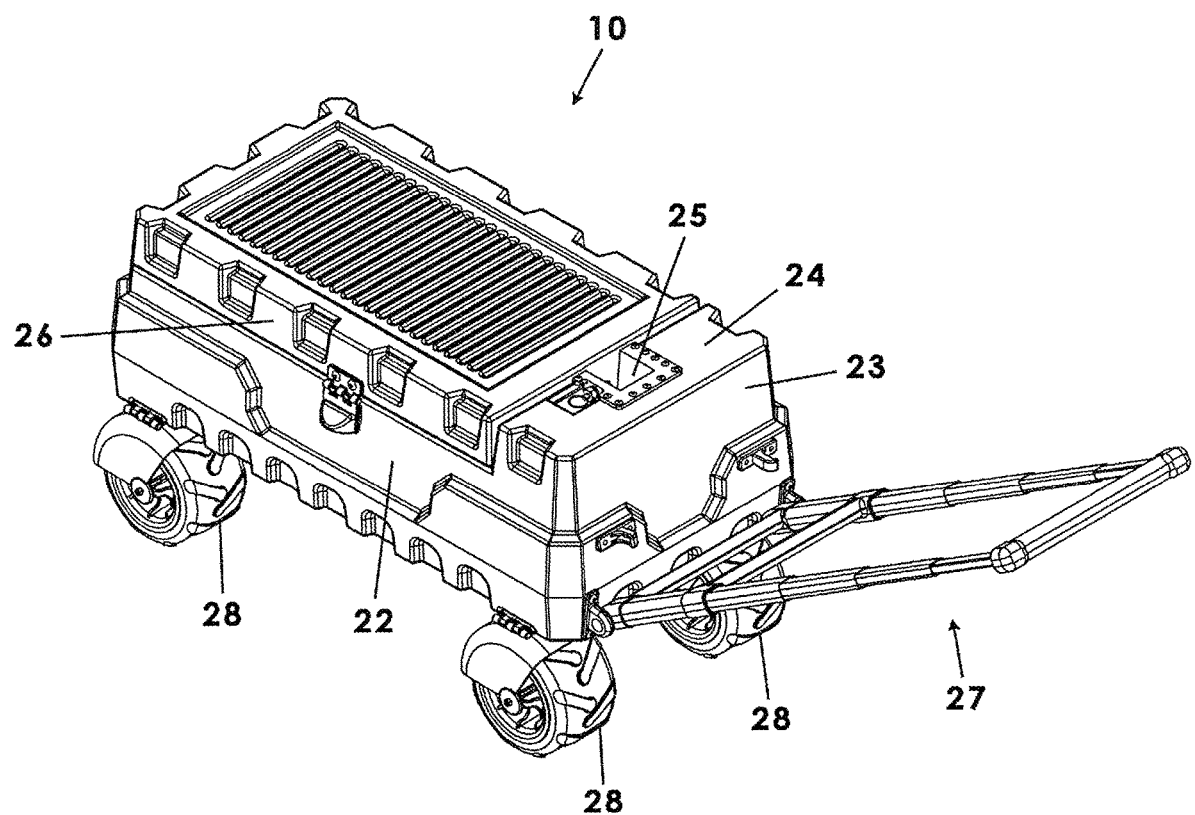
FIG. 2 is a perspective view of the mobile sheltered workstation as in FIG. 1, illustrated with a handle member in an extended configuration.
Figure 3:
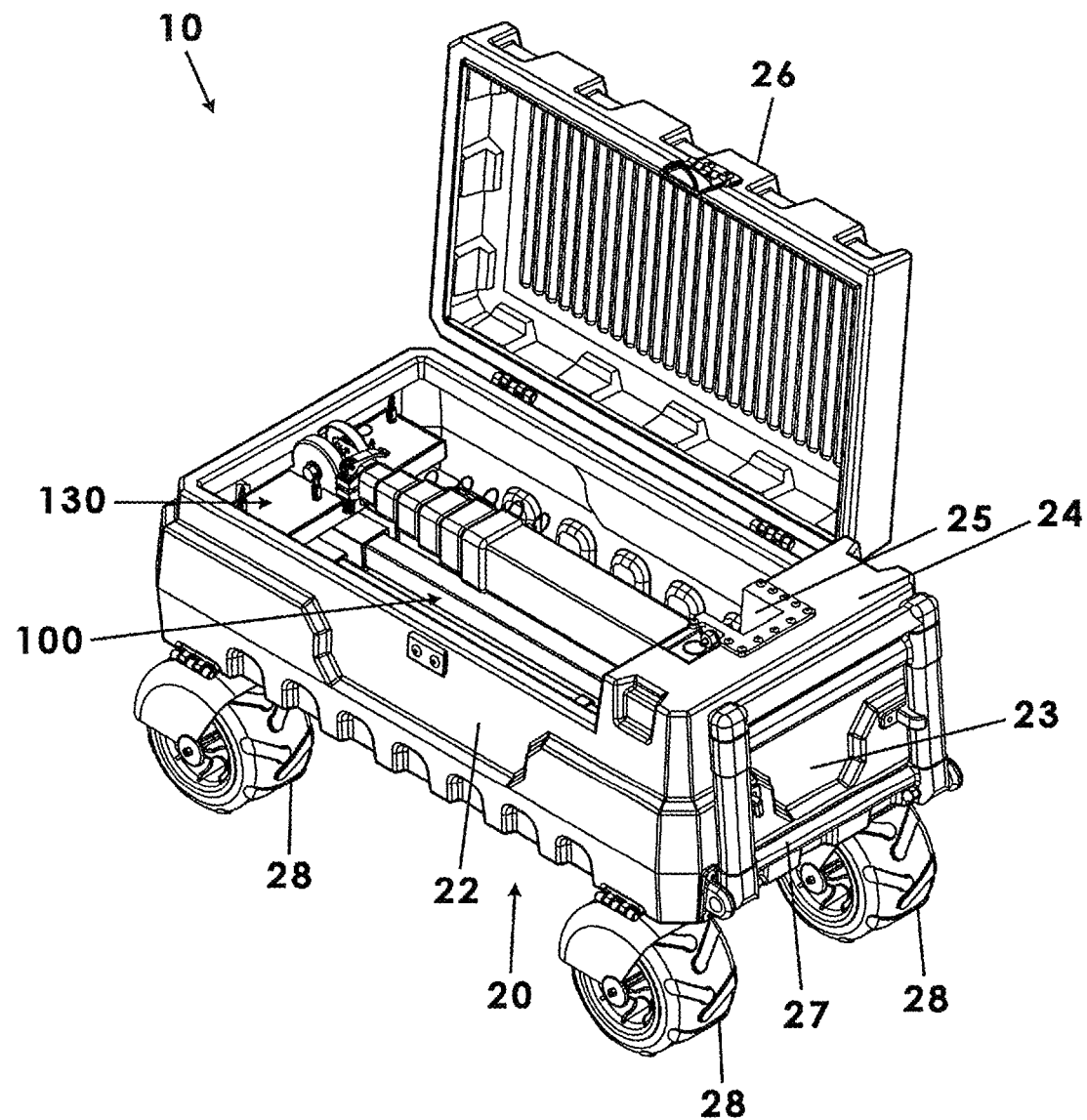
FIG. 3 is a perspective view of the mobile sheltered workstation as in FIG. 1, illustrated with the housing lid in an open configuration and the main support member (mast) in a stowed configuration.

Together, the bottom and side walls define an interior area and an open top by which to access the interior area. In addition, the housing 20 may include a lid 26 that has an edge pivotally coupled to an upper edge of a respective side wall 22 such that the lid 26 is pivotally movable between an open configuration allowing access to the interior area (FIG. 4) and a closed configuration blocking access to said interior area (FIG. 2). Further, the front wall 23 of the housing defines a notch 25 having a configuration operable to receive the main support member 100 when deployed. The main support member 100 and canopy framework 140 may only be deployed when the lid 26 is open although the lid 26 may then again be closed once the main support member 100 is moved to an upright configuration, i.e. when positioned in the notch 25 as will be described later.

Further, the housing 20 may include a handle 27 for convenient pulling of the housing 20 to a desired location. The handle 27 may include a proximal end pivotally coupled to a front wall 23 of the housing 20 and a distal end opposite said proximal end and spaced apart from said front side wall. The handle 27 may be length adjustable such as having a telescopic construction. To be clear, the handle 27 may be both pivotally coupled to the front of the wagon and also telescopically length adjustable for maximum utility in use.

In yet another aspect, the housing 20 (wagon) may include a plurality of wheels 28—preferably, four wheels spaced apart from one another and operably coupled to corners of a rectangular bottom wall 21 although a housing 20 having three wheels arranged in the form of a tricycle is also disclosed. It is understood that laterally opposed wheels may be mounted to a common axle extending therebetween or, alternatively, operatively mounted individually to the housing 20. Further, each wheel 28 may include a circular disc or a castor wheel capable of 360 degree rotation.

The main support member 100 includes a lower end 102 coupled to the housing 20 and extending upwardly therefrom. Further, the lower end 102 may be pivotally coupled to the bottom wall 21 adjacent the front wall 23 so that the main support member 100 may be pivotally movable between a stowed configuration completely inside the interior area of the housing 20 (FIG. 4) and a deployed configuration that is upright and generally perpendicular to the plane defined by the bottom wall 21 (FIG. 5a) Further, the housing 20 may include a ledge 24 positioned between the open top/lid 26 and the front wall 23, the ledge 24 defining the cutout or notch 25 having a dimension complementary to a configuration of the lower end 102 of the main support member 100. In operation, the lower end 102 is pivotally moved and received into a nested configuration in the notch 25 when the main support member 100 is moved to the deployed configuration (FIG. 5a). It is understood that the notch 25 is configured to surround the lower end 102 of the main support member 100 at the deployed configuration—adding to the strength and stability of the main support member 100 and canopy framework 140 to be described later. The housing 20 may include a mast fastener 101, such as a spring-loaded pin (FIG. 5b), positioned proximate the notch 25 and operable for selectively engaging the lower end 102 of the main support member 100 and, in so engaging, securing or locking the main support member 100 at the deployed and upstanding configuration (FIG. 5a).

The main support member 100 may be length adjustable and telescopically movable between a retracted configuration (FIG. 5a) and an extended configuration (FIG. 1). More particularly, the main support member 100 may include a plurality of main support member sections 110 configured to nest within the main support member 100 at the retracted configuration and to incrementally extend upwardly from the main support member 100 at the extended configuration. The main support member sections 110 are shown in retracted and nested configurations, respectively, in FIG. 5a.

Each main support member section 110 may be configured so as to be secured at selected positions when the main support member 100 is at the extended configuration. Each main support member section 110 may include a collar 111 that defines at least one hole (unnumbered but shown by implication with pin 122) configured to receive a pin 122 so as to hold the plurality of main support member sections 110 at respective selected positions when respective holes 120 in respective main support member sections 110 receive respective pins 122. It is understood that each main support member section 110 may define a plurality of holes so as to provide a variety of selectable positions. It is understood that the pins 122 may be spring-loaded so as to be quickly and easily deployed at the extended configuration. Each spring-loaded pin may be actuated by the press of a spring button (FIG. 8d) as would be known in the art. It can be seen that the main support member sections 110 are configured to move from a nested or contracted configuration (such as to facilitate the stowed configuration in the interior area of the housing or even at the upstanding configuration in the notch 25) to a fully extended configuration—fully deploying the main support member 100.

Figure 4A:
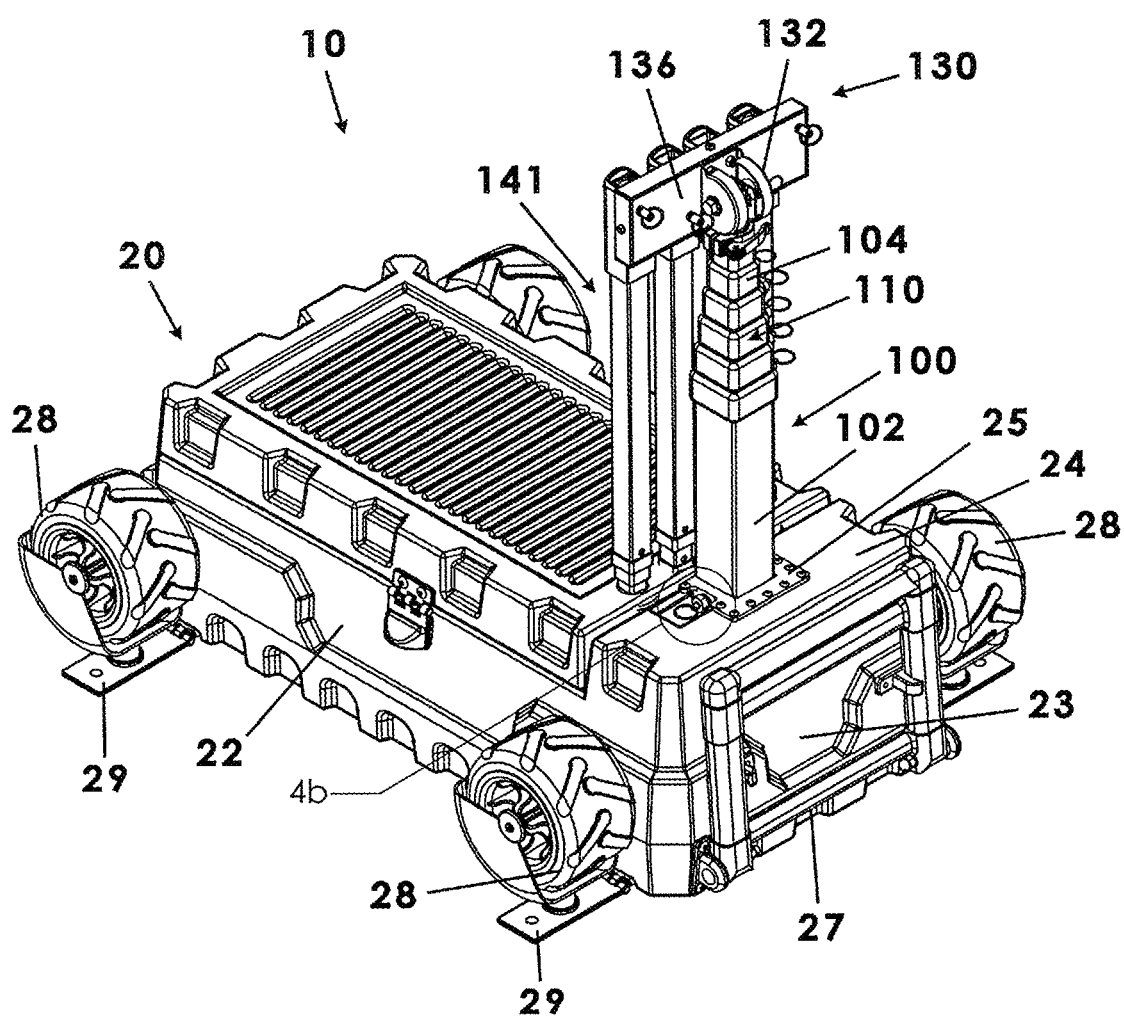
FIG. 4a is a perspective view of the mobile sheltered workstation as in FIG. 3, illustrated with the main support member in an upstanding configuration.
Figure 4B:
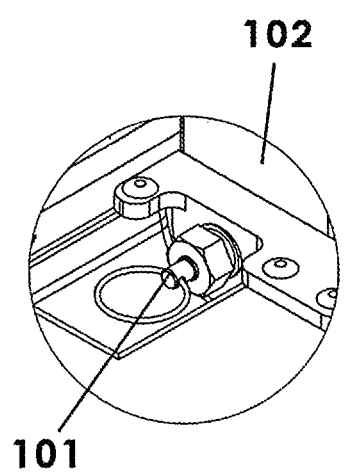
Figure 5:
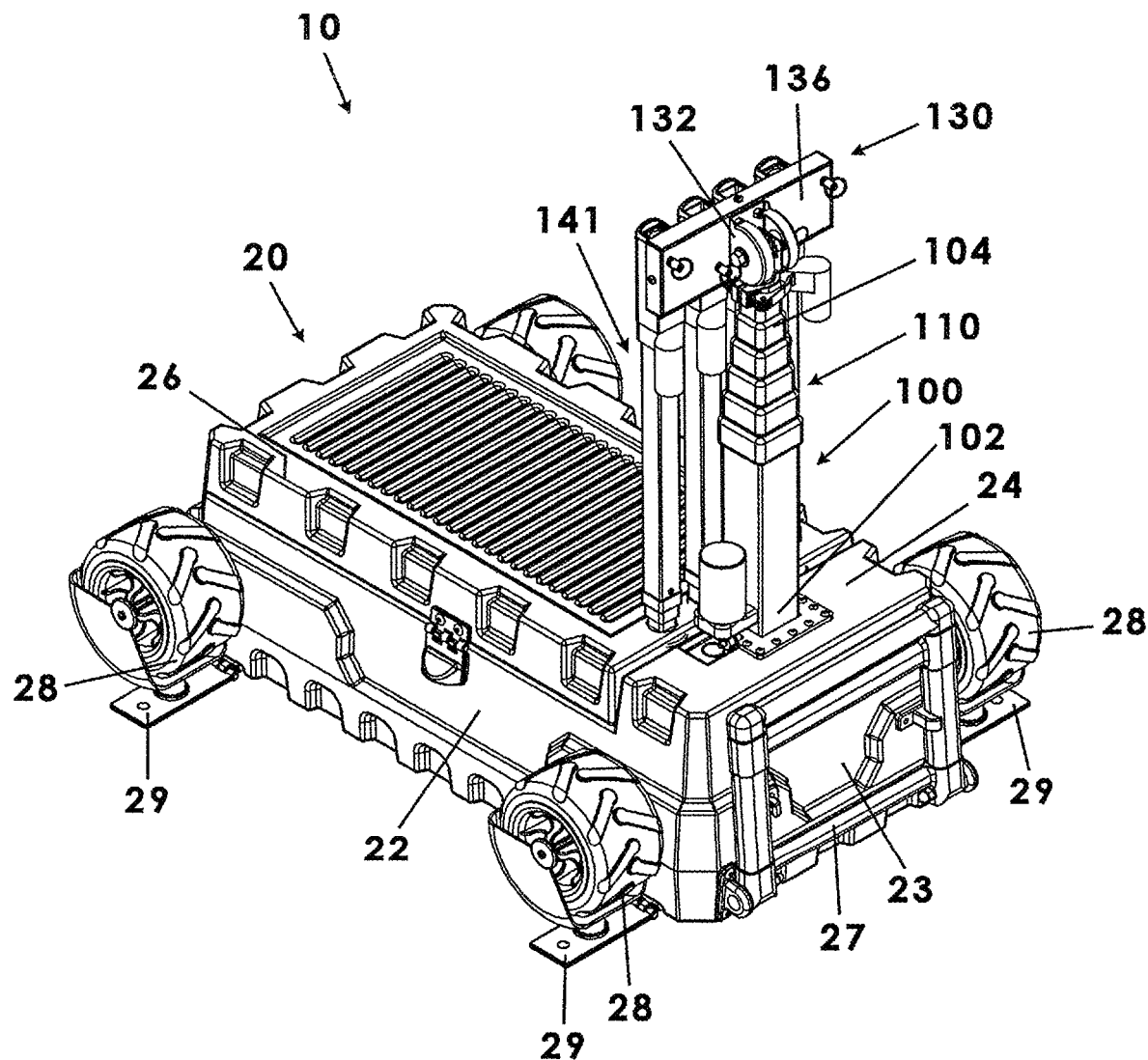
FIG. 5 is a perspective view of the mobile sheltered workstation as in FIG. 4, illustrated with the main support member in an upstanding configuration and showing a cup holder deployed.

In an important aspect, the mobile sheltered workstation 10 includes an interface member 130 situated intermediate and coupled to the upper end of the main support member 100 and to the proximal end of the canopy framework 140. The interface member 130 has a configuration that enables adjusting the angles of the canopy 50 relative to the main support member 100. The interface member 130 is pivotally coupled to both the main support member 100 and to the canopy framework 140 so as to selectively allow both portions to fold in parallel to one another when retracted and stowed in the interior area of the housing 20 (FIGS. 4 and 5a). Stated another way, the upper end 104 of the main support member 100 is angularly and adjustably coupled to an interface member 130 and the interface member 130 is coupled to the canopy framework 140. The interface member 130 may be configured as a plate having a bottom face 136 and a top face 134 opposite the bottom face. The interface member 130 may include a multi-angle mounting assembly 132 fixedly attached to the bottom face to which the upper end 104 of the main support member 100 may be pivotally and releasably coupled, such as with an adjustment fastener 113. The adjustment fastener may be a pin, a screw, a screw/wing-nut combination, or the like. In other words, the mounting assembly 132 enables the upper end 104 to be coupled thereto by tightening the fastener or loosened so as to adjust an angle of attachment and then re-tightened. Put simply, the mounting assembly 132 of the interface member 130 allows angular movement of the canopy framework with regard to the main support member 100.

Returning to the canopy framework 140, the mobile sheltered workstation 10 includes a canopy framework 140 specifically configured for securing the canopy 50 atop the main support member 100. In general, the canopy framework 140 is an assembly that includes a proximal end operably coupled to an upper end 104 of the main support member 100 and includes a plurality of support braces 141, each support brace 141 being length adjustable and movable between retracted and extended configurations.

Figure 9A:
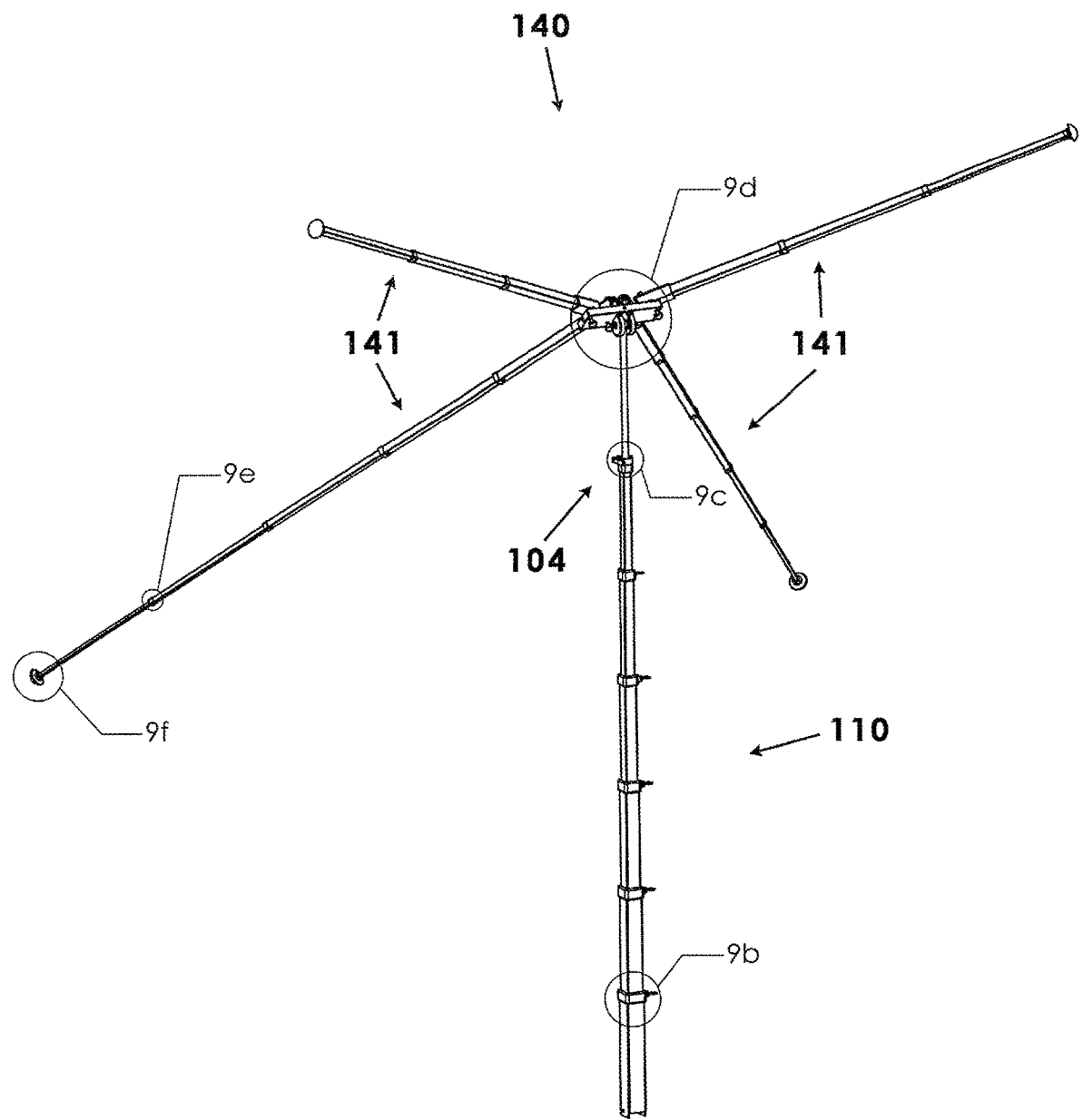
FIG. 9a is a perspective view of the mobile workstation according to the present invention, illustrated in a fully deployed and extended configuration.
Figure 9B:
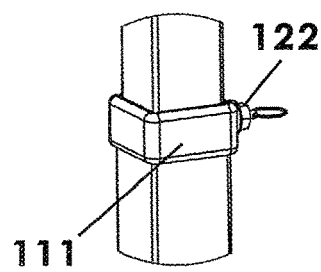
Figure 9C:
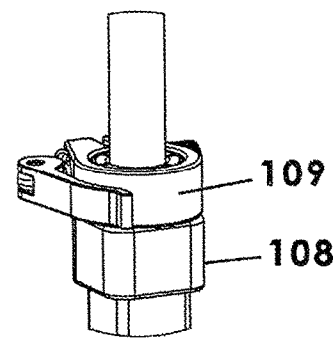
Figure 9D:
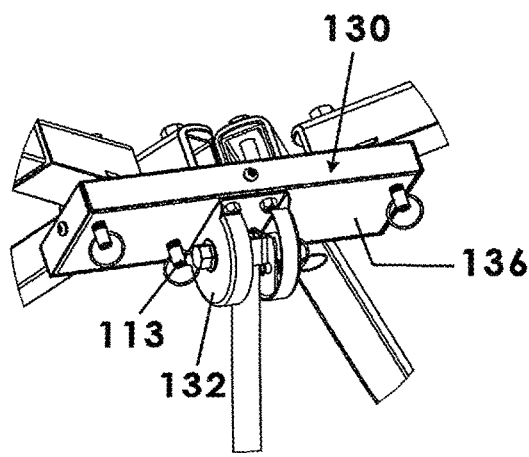
Figure 9E:
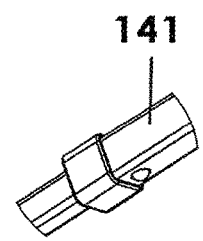
Figure 9F:
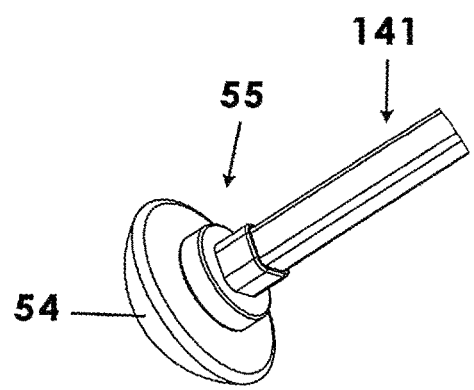

More particularly, the canopy framework 140 may include a first support brace 141a, a second support brace 141b, a third support brace 141c, and a fourth support brace 141d. Each support brace may include a plurality of support brace sections that may be nested within adjacent sections and slidably movable in a telescoping configuration. As described previously, telescopic sections may include collars, holes, and pins arranged in a manner understood by manufacturers of ordinary skill in the art. Further, the sections may incorporate spring-loaded push-button construction (FIG. 9e). Even more specifically, the first support brace 141a has an interior end pivotally coupled to the interface member 130 in an angle adjustable arrangement. In other words, the first support brace 141a is pivotally movable between a first position substantially perpendicular to said main support member 100 when the main support member 100 is at the extended (upright) position and a second position that is angularly offset relative to the first position. Viewed another way, the pivotal attachment of the first support brace 141a allows the canopy framework 140 to pivot from a position parallel to a ground surface to another selective position angularly offset from the position parallel to the ground.

Figure 6:
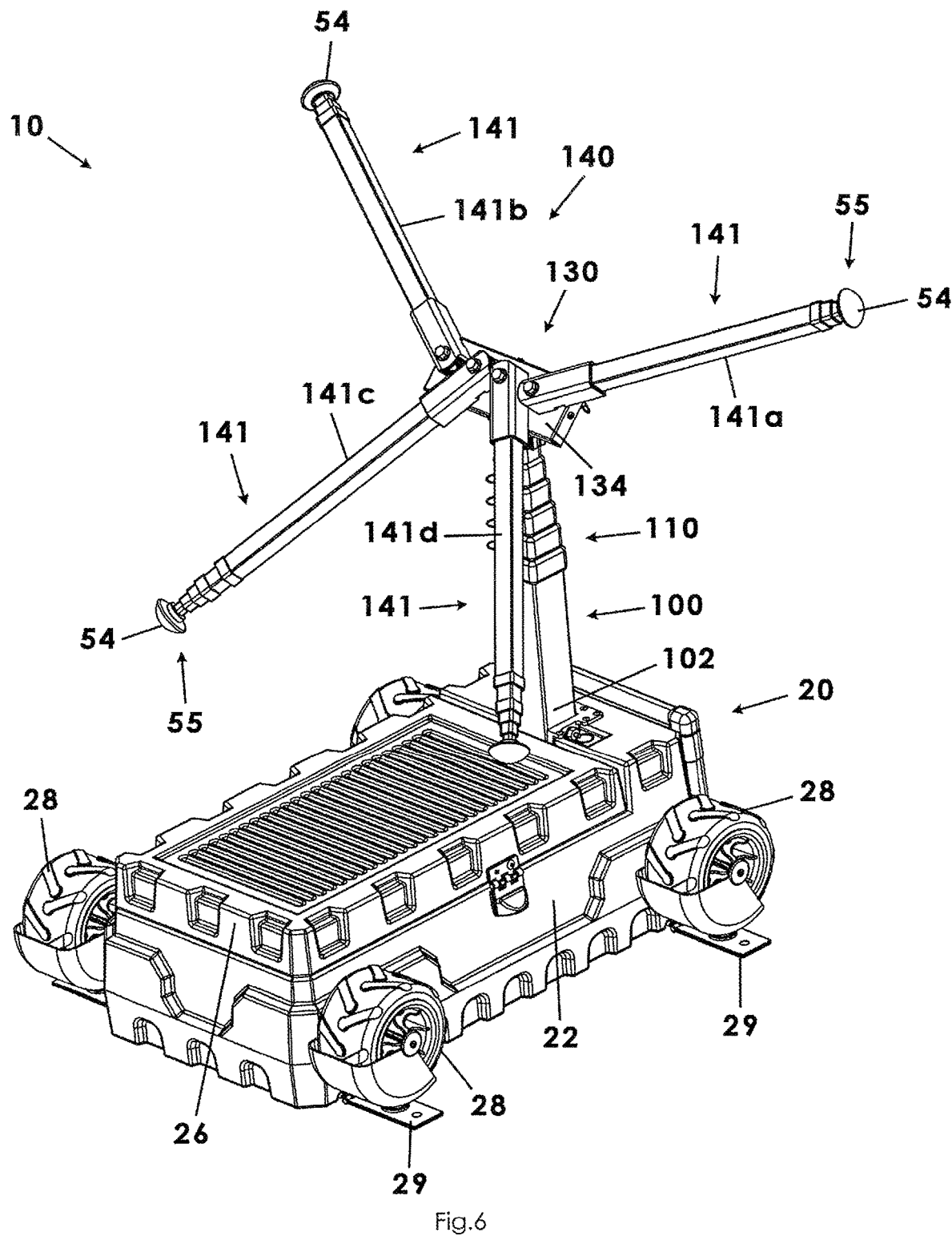
FIG. 6 is a perspective view of the mobile workstation as in FIG. 4a illustrated with the main support member and canopy support framework in upstanding and deployed configurations, respectively.
Figure 7:
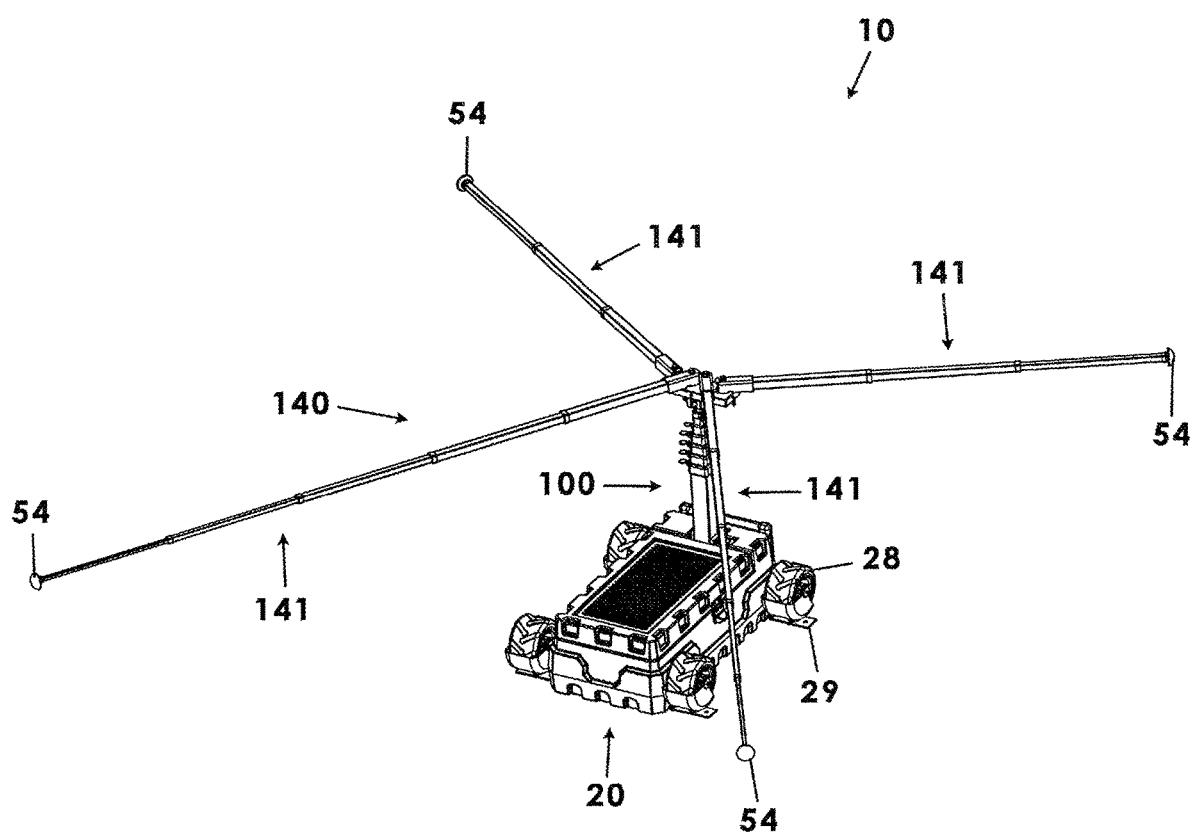
FIG. 7 is a perspective view of the mobile workstation as in FIG. 6, illustrated with main support member in an upstanding configuration and the canopy framework in a fully deployed configuration.

Further, the canopy framework 140 may include a second support brace 141b also pivotally coupled to the interface member 130, the second support brace 141b being spaced apart from the first support brace 141a such as, preferably, 90 degrees offset from any adjacent support brace (FIG. 6). In like manner, the canopy framework 140 may include a third support brace 141c also pivotally coupled to the interface member 130, the third support brace 141c being spaced apart from the second support brace 141b such as, preferably, 90 degrees offset from any adjacent support brace. Further, the canopy framework 140 may include a fourth support brace 141d also pivotally coupled to the interface member 130, the fourth support brace 141d being spaced apart from the third support brace 141c.

Figure 8A:
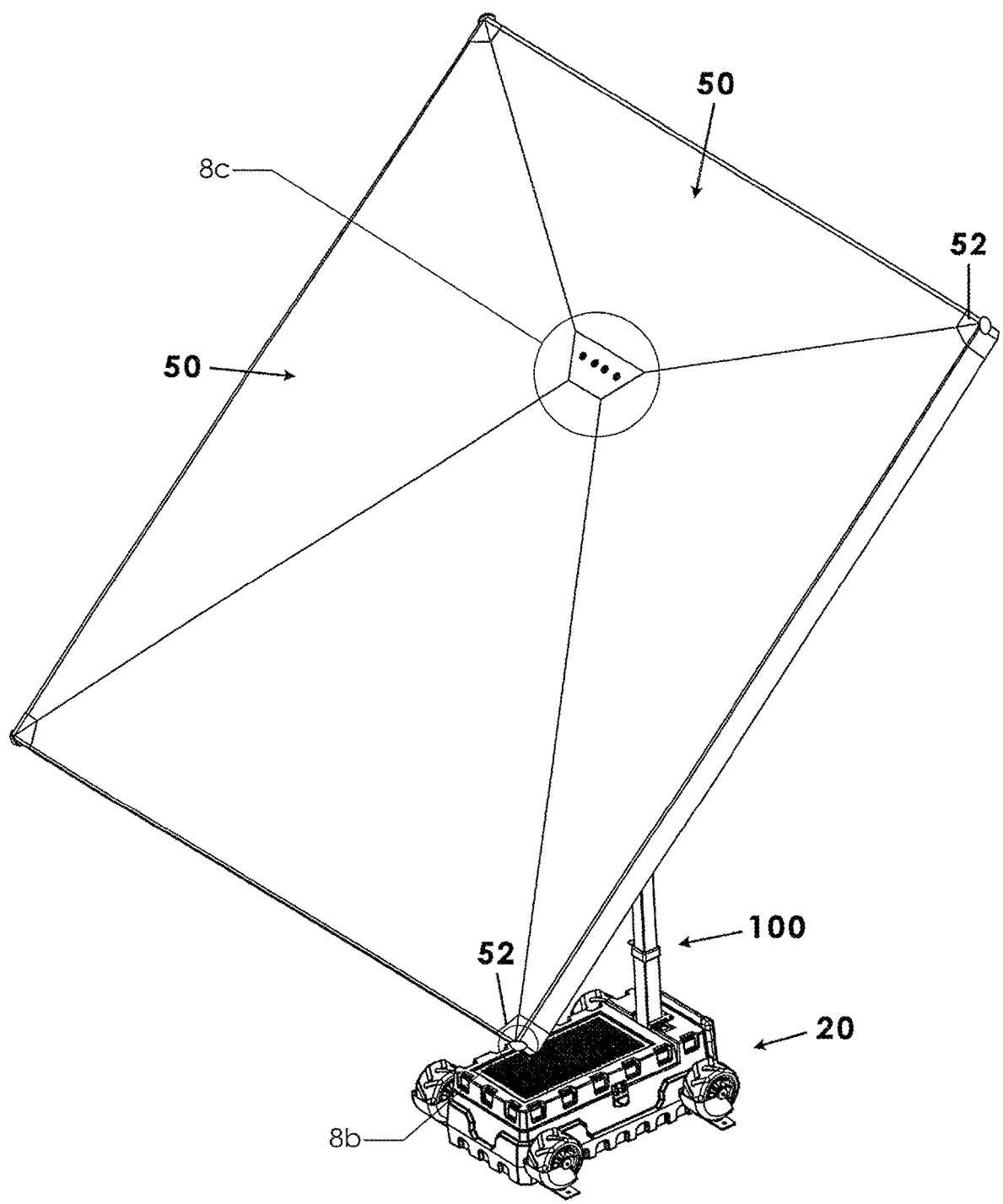
FIG. 8a is a perspective view of the mobile workstation mounted about the canopy framework and extending above the housing.
Figure 8B:
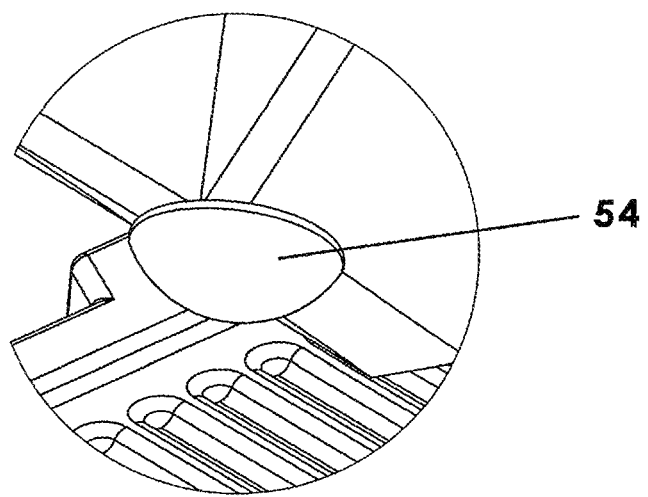
Figure 8C:
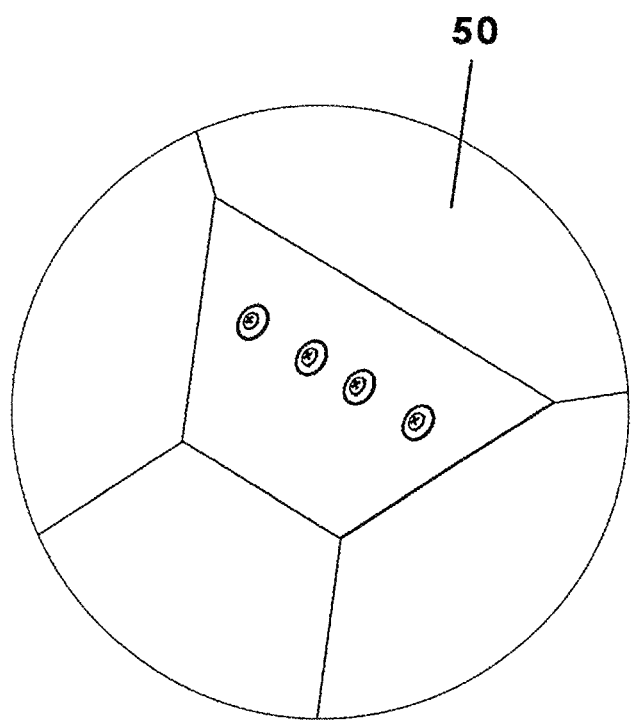

In another aspect, an actual canopy 50 configured to substantially block sunlight and other weather events may be coupled to the canopy framework 140 when said framework is telescopically deployed. In one embodiment, the canopy framework 140 may include a plurality of attachment elements 55 to which the canopy 50 may be attached and so that the canopy 50 may be configured to cover a predetermined geometric area. In an embodiment, each attachment element 55 may include a round or disc-shaped flange 54 situated at a free end of a respective support brace 141 (FIG. 8a). Further, the canopy 50 may define a slot 52 or cutout or pocket complementary to the flange 54 so as to be received by and secured thereto (FIG. 1). It is understood that the canopy may also include a rain shield cover positioned over each canopy attachment element so as to prevent leakage through the canopy.

In a related aspect, the canopy framework 200 may be adjustable to accommodate different canopy 50 shapes and sizes to accommodate different shelter requirements such as when high winds or obstacles near a worksite prevent the use of a large canopy 50 or when a large worksite requires the use of a large canopy. The canopy framework 200 may be adjustable to accommodate different canopy tension requirements to accommodate different shelter requirements, such as to tighten the canopy during high winds or to allow the canopy to droop on one or more sides to divert rain water from a worksite.

In another aspect, the canopy framework 140 is selectively rotatable so as to spin the canopy 50 for shading a selected area. More specifically, the upper end 104 of the main support member 100 may include a rotatable section 108 rotatably coupled to the immediately prior section of the main support member 100 so as to be selectively and rotatably nested therein (FIG. 7c). Even more specifically, the rotatable section 108 may include a rod rotatably nested in a locking clamp 109. The locking clamp 109 may include a spring-loaded fastener that is movable between an unlocked configuration allowing the rotatable section 108 to rotate the canopy framework 140 relative to the main support member and a locked configuration preventing the rod of said canopy framework from rotating relative to the main support member. By rotating the canopy framework 140, the canopy 50 itself is rotated.

In yet another aspect and as seen FIGS. 4a to 8a, the housing 20 may include a plurality of ground anchors 29 pivotally coupled to a side wall 22 or bottom wall 21 and which may be folded out so as to support the weight of the housing 20 upon a ground surface before the main support member 100 (mast) is deployed and extended. More particularly, each ground anchor may be pivotally movable between a retracted or stowed configuration underneath the housing 20 (e.g. beneath the lower wall) and a deployed configuration extending away from a respective wall 22 to which it is pivotally coupled. In another embodiment, each ground anchor 29 may be slidably coupled to the housing 20 and moved slidably between the retracted and extended configurations. The anchors 29 provide stability and balance when the invention is in use. It is understood that the wheels 28 may be pivoted or rotated upwardly out of the way when the anchors 29 are deployed so as to ensure that the housing 20 does not roll or move unexpectedly when deployed and in use.

In some embodiments (not shown), the deployment and extension of the main support member 100, length adjustable main support member sections 110, and length adjustment of the brace member sections 141 may be operated electrically, e.g. by simply pressing an actuation button. More particularly, a wiring harness may be electrically connected to a battery situated in the housing 20 and extend upwardly through the main support member 100 and be electrically connected to respective actuators associated with the lower end 102 and main support member sections 110 thereof. When energized, the actuators are operable to cause the lower end 10 to pivot to the upstanding configuration and for the main support member sections 110 to move an extended configuration. Similarly, another wiring harness may be electrically connected to the battery and operable to energize more respective actuators to extend support brace sections 141.

In use, the mobile sheltered workstation 10 provides a person with a mobile worksite shelter. It should be appreciated that the main support member 100 and the canopy framework 140 may be stored in the back of a truck or van—so as to provide easier transportation to and from a worksite, beach, ballpark, or the like—when they are at retracted and stowed configurations, respectively. Upon arrival at the desired destination, the housing/wagon 20 may be rolled to a specific location using the wheels 28 and handle 27. The wagon lid 26 may be opened and the main support member 100 deployed and extended and the canopy framework 140 deployed as described above. Then, the canopy 50 may be coupled to the canopy framework 200. It is understood that the canopy framework 140 and canopy 50 may be deployed before the main support member 100 is fully extended for convenience. Then the main support member 100 is moved to its extended configuration so as to create a quick and convenient shelter at the location. This method of use is evident by the progression of the accompanying drawings.

It is understood that while certain forms of this invention have been illustrated and described, it is not limited thereto except insofar as such limitations are included in the following claims and allowable functional equivalents thereof.

The invention claimed is:

1. A mobile sheltered workstation, comprising:
    a housing indicative of a wagon and having a bottom wall and a plurality of side walls extending upwardly from a perimeter edge of said bottom wall that, together, define an interior area and an open top;
    a main support member having a lower end coupled to said housing proximate said bottom and extending upwardly therefrom, said main support member being length adjustable and movable between a retracted configuration situated in said interior area and an extended configuration extending upwardly from said interior area, said main support member having a telescopic construction;
    a canopy framework having a proximal end selectively coupled to an upper end of said main support member, said canopy framework being movable between a stowed configuration adjacent and parallel to said main support member and a deployed configuration extending radially away from said main support member; and
    a locking clamp mounted to said upper end of said main support member, said upper end including, a rotating section rotatably coupled to said locking clamp;
    wherein said canopy framework is operably coupled to said rotating section said upper end of said main support member;
    wherein said locking clamp is movable between an unlocked configuration allowing said rotating section of said upper end to rotate said canopy framework relative to said main support member and a locked configuration preventing said rod of said canopy framework from rotating relative to said main support member.

2. The mobile sheltered workstation as in claim 1, wherein said housing includes a lid having an edge pivotally coupled to an upper edge of a respective side wall such that said lid is pivotally movable between an open configuration allowing access to said interior area and a closed configuration blocking access to said interior area.

3. The mobile sheltered workstation as in claim 1, further comprising a canopy selectively coupled to said canopy framework when said canopy framework is at said deployed configuration, said canopy being configured to cover a geometric area defined by said canopy framework.

4. The mobile sheltered workstation as in claim 3, wherein said canopy framework includes a plurality of support braces coupled to an interface member which, in turn, is coupled to said upper end of said main support member, each support brace being length adjustable, spaced apart from any adjacent support brace, and configured to engage with said canopy.

5. The mobile sheltered workstation as in claim 4, wherein said each support brace includes a plurality of support brace sections that are slidably and telescopically movable between retracted and extended positions relative to one another.

6. The mobile sheltered workstation as in claim 5, wherein said plurality of support braces includes:
    a first support brace pivotally coupled to said interface member and pivotally movable between a first position perpendicular to said main support member when said main support member is at said extended configuration and a second position angularly offset from said first position; and
    a second support brace spaced apart from said first support member and pivotally coupled to said interface member and pivotally movable between a first position perpendicular to said main support member when said main support member is at said extended configuration and a second position angularly offset from said first position.

7. The mobile sheltered workstation as in claim 6, wherein said plurality of support braces includes:
    a third support brace spaced apart from said second support member and pivotally coupled to said interface member and pivotally movable between a first position perpendicular to said main support member when said main support member is at said extended configuration and a second position angularly offset from said first position; and
    a fourth support brace spaced apart from said third support member and pivotally coupled to said interface member and pivotally movable between a first position perpendicular to said main support member when said main support member is at said extended configuration and a second position angularly offset from said first position.

8. The mobile sheltered workstation as in claim 4, wherein:
    said interface member is a plate having a bottom face and a top face opposite said bottom face, said interface member having a mounting assembly integrally attached to said bottom face and pivotally coupled to said upper end of said main support member with an adjustment fastener.

9. The mobile sheltered workstation as in claim 8, wherein said adjustment fastener is a pin that is selectively operable to secure said interface member at a selected angle relative to said main support member.

10. The mobile sheltered workstation as in claim 1, wherein:
    said main support member includes a plurality of main support member sections movable from a nested configuration at which each main support member section is configured to nest within an adjacent main support ember section and an extended configuration at which said each main support member section incrementally extends upwardly from said adjacent main support member section; and wherein each main support member section includes a collar and a support pin that are configured to, together, secure said each main support member at a selected length position.

11. The mobile sheltered workstation as in claim 10, wherein each collar of a respective main support member section defines at least one hole configured to receive an associate support pin so as to hold said plurality of main support member sections at respective selected positions, respectively.

12. The mobile sheltered workstation as in claim 1, wherein said housing includes a handle having a proximal end pivotally coupled to a front side wall of said housing and a distal end opposite said proximal end and displaced from said front side wall, said handle being length adjustable.

13. The mobile sheltered workstation as in claim 12, further comprising a plurality of wheels operably coupled to said bottom wall of said housing.

14. A mobile sheltered workstation, comprising a housing indicative of a wagon and having a bottom wall and a plurality of side walls extending upwardly from a perimeter edge of said bottom wall that, together, define an interior area and an open top;

a handle having a proximal end pivotally coupled to a front side wall of said housing and a distal end opposite said proximal end and displaced from said front side wall, said handle being length adjustable;

a lid having an edge pivotally coupled to an upper edge of a respective side wall such that said lid is pivotally movable between an open configuration allowing access to said interior area and a closed configuration blocking access to said interior area;

a plurality of wheels operably coupled to said bottom wall of said housing;

a main support member having a lower end pivotally coupled to said housing proximate said bottom and extending upwardly therefrom, said main support member being length adjustable and pivotally movable between a stowed configuration situated in said interior area and an upstanding configuration extending upwardly from said interior area, said main support member having a telescopic construction; and a canopy framework having a proximal end selectively coupled to an upper end of said main support member, said canopy framework being movable between a stowed configuration adjacent and parallel to said main support member and a deployed configuration extending radially away from said main support member; and a canopy selectively coupled to said canopy framework when said canopy framework is at said deployed configuration, said canopy being configured to cover a geometric area defined by said canopy framework.

15. The mobile sheltered workstation as in claim 14, wherein said housing defines a notch having a dimension complementary to a lower portion of said main support member, said lower end of said main support member being positioned in said notch so that said notch surrounds and supports said lower portion of said main support member when said main support member is moved to said upstanding configuration.

16. The mobile sheltered workstation as in claim 15, wherein:

said housing includes a ledge in communication with and situated atop a front wall of said housing, said ledge defining said notch; and said ledge and said notch being situated laterally adjacent said lid and said interior area such that said lid is movable between said open and closed configurations when said lower end of said main support member is at said upstanding configuration.

17. The mobile sheltered workstation as in claim 14, wherein:

said main support member includes a plurality of main support member sections movable from a nested configuration at which each main support member section is configured to nest within an adjacent main support member section and an extended configuration at which said each main support member section incrementally extends upwardly from said adjacent main support member section; and wherein each main support member section includes a collar and a support pin that are configured to, together, secure said each main support member at a selected length position.

18. The mobile sheltered workstation as in claim 17, wherein each collar of a respective main support member section defines at least one hole configured to receive an associate support pin so as to held said plurality of main support member sections at respective selected positions, respectively.

19. The mobile sheltered workstation as in claim 14, further comprising:

a locking clamp mounted to said upper end of said main support member, said lower end of said canopy framework including a rod extending through and in operative contact with said locking clamp; and said locking clamp being movable between an unlocked configuration allowing said rod to rotate said canopy framework relative to said main support member and a locked configuration preventing said rod of said canopy framework from rotating relative to said main support member.

20. The mobile sheltered workstation as in claim 14, wherein said canopy framework includes a plurality of support braces coupled to an interface member which, in turn, is coupled to said upper end of said main support member, each support brace being length adjustable, spaced apart from any adjacent support brace, and configured to engage with said canopy.

21. The mobile sheltered workstation as in claim 20, wherein said each support brace includes a plurality of support brace sections that are slidably and telescopically movable between retracted and extended positions relative to one another.

22. The mobile sheltered workstation as in claim 21, wherein said plurality of support braces includes:

a first support brace pivotally coupled to said interface member and pivotally movable between a first position perpendicular to said main support member when said main support member is at said extended configuration and a second position angularly offset from said first position; and a second support brace spaced apart from said first support member and pivotally coupled to said interface member and pivotally movable between a first position perpendicular to said main support member when said main support member is at said extended configuration and a second position angularly offset from said first position.

23. The mobile sheltered workstation as in claim 22, wherein said plurality of support braces includes:
- a third support brace spaced apart from said second support member and pivotally coupled to said interface member and pivotally movable between a first position perpendicular to said main support member when said main support member is at said extended configuration and a second position angularly offset from said first position; and
- a fourth support brace spaced apart from said third support member and pivotally coupled to said interface member and pivotally movable between a first position perpendicular to said main support member when said main support member is at said extended configuration and a second position angularly offset from said first position.

24. The mobile sheltered workstation as in claim 20, wherein:
- said interface member is a plate having a bottom face and a top face opposite said bottom face, said interface member having a mounting assembly integrally attached to said bottom face and pivotally coupled to said upper end of said main support member with an adjustment fastener.

25. The mobile sheltered workstation as in claim 14, further comprising: a plurality of ground anchors pivotally coupled to opposing side walls of said housing proximate said plurality of wheels, respectively, each ground anchor being pivotally movable between a retracted configuration positioned beneath said housing and a deployed configuration extending laterally away from said respective side wall.

\* \* \* \* \*